United States Patent
Zheng et al.

(10) Patent No.: US 7,378,363 B2
(45) Date of Patent: May 27, 2008

(54) DIELECTRIC CERAMIC COMPOSITION HAVING WIDE SINTERING TEMPERATURE RANGE AND REDUCED EXAGGERATED GRAIN GROWTH

(75) Inventors: Jingmin Zheng, Frederick, MD (US); David B. Cruickshank, Rockville, MD (US); David J. Cronin, Frederick, MD (US); David A. Tolino, Middletown, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 20 days.

(21) Appl. No.: 11/133,960

(22) Filed: May 20, 2005

(65) Prior Publication Data

US 2006/0264316 A1 Nov. 23, 2006

(51) Int. Cl.
*C04B 35/465* (2006.01)
(52) U.S. Cl. ..................................... 501/136
(58) Field of Classification Search ........... 501/136
See application file for complete search history.

(56) References Cited

U.S. PATENT DOCUMENTS

| | | | |
|---|---|---|---|
| 4,533,974 A * | 8/1985 | Maher ........................ 361/320 |
| 5,147,835 A * | 9/1992 | Franzak et al. ............. 501/134 |
| 5,340,784 A * | 8/1994 | Katoh et al. ................ 501/136 |
| 5,547,908 A * | 8/1996 | Furuzawa et al. .......... 501/136 |
| 5,767,030 A | 6/1998 | Kim et al. |
| 5,866,492 A * | 2/1999 | Kim et al. ................... 501/134 |
| 5,916,834 A * | 6/1999 | Terashi et al. .............. 501/135 |
| 6,251,816 B1 * | 6/2001 | Maher et al. ................ 501/138 |
| 6,309,995 B1 * | 10/2001 | Maher et al. ............... 501/138 |
| 6,645,895 B2 | 11/2003 | Sato et al. |
| 6,743,744 B1 * | 6/2004 | Kim et al. ................... 501/134 |
| 6,794,324 B1 * | 9/2004 | Kim et al. ................... 501/134 |
| 7,138,352 B2 * | 11/2006 | Lee et al. .................... 501/136 |

FOREIGN PATENT DOCUMENTS

| JP | 8-45348 | * | 2/1996 |
|---|---|---|---|
| JP | 11-100262 | * | 4/1999 |

* cited by examiner

*Primary Examiner*—Karl E Group
(74) *Attorney, Agent, or Firm*—Farjami & Farjami LLP

(57) ABSTRACT

According to one exemplary embodiment, a dielectric ceramic composition includes a main component group, where the main component group is represented by $Mg_xCa_yZn_zTiO_{2+x+y+z}$, where the sum of x, y, and z is less than or equal to 1.0 such that the dielectric ceramic composition has a wider sintering temperature range and reduced exaggerated grain growth. According to one embodiment, x can be greater than 0.0 and less than 1.0, y can be greater than 0.0 and less than 1.0, and z can be greater than 0.0 and less than 1.0. The dielectric ceramic composition can further include between 0.0 and 50.0 percent by weight of aluminum oxide. The dielectric ceramic composition can further include copper oxide. The dielectric ceramic composition can further include boron oxide.

14 Claims, 3 Drawing Sheets

Fig. 1

| | x | y | z | x + y + z | Al$_2$O$_3$ (% by wt.) |
|---|---|---|---|---|---|
| 112 | 0 < x < 1 | 0 < y < 1 | 0 < z < 1 | x + y + z ≤ 1 | 0 - 50 |
| 114 | 0 < x < 2 | 0 < y ≤ 1 | 0 < z < 0.03 | 1 < x + y + z < 2 | 0 - 50 |
| 116 | 0 < x < 2 | 0 < y ≤ 1 | 0.09 < z ≤ 1 | 1 < x + y + z < 2 | 0 - 50 |

| | 204a | 204b | 204c | 204d | 204e | 204f | 204g | 204h | 204i |
|---|---|---|---|---|---|---|---|---|---|
| | x | y | z | x+y+z | $Al_2O_3$ | $\varepsilon'$ | $\tau_f$ | QxF | Sintering Temperature °C |
| 204a | 0.922 | 0.071 | 0.007 | 1.000 | 0 | 20.53 | 12.89 | 15567 | 1265 |
| 204b | 0.675 | 0.052 | 0.273 | 1.000 | 0 | 21.01 | -32.41 | 45777 | 1240 |
| 204c | 0.846 | 0.065 | 0.116 | 1.027 | 0 | 21.18 | 4.92 | 48939 | 1275 |
| 204d | 0.591 | 0.074 | 0.335 | 1.000 | 0 | 23.54 | 7.49 | 31438 | 1200 |
| 204e | 0.928 | 0.071 | 0.447 | 1.447 | 0 | 19.43 | 0 | 41162 | 1275 |
| 204f | 0.928 | 0.071 | 0.149 | 1.149 | 5 | 20.39 | 2.71 | 55944 | 1275 |
| 204g | 0.928 | 0.071 | 0.894 | 1.894 | 37.5 | 14.36 | -2.72 | 15202 | 1275 |
| 204h | 1.485 | 0.130 | 0.127 | 1.743 | 0 | 20.64 | 69.8 | 32819 | 1355 |
| 204i | 0.436 | 0.034 | 0.530 | 1.000 | 0 | 25.53 | -44.05 | 25971 | 1220 |
| 204j | 0.839 | 0.071 | 0.089 | 1.000 | 5 | 20.21 | -5.5 | 49198 | 1275 |
| 204k | 0.839 | 0.071 | 0.089 | 1.000 | 5 | 20.71 | -5.07 | 61114 | 1290 |
| 204l | 0.839 | 0.071 | 0.089 | 1.000 | 5 | 20.32 | -6.37 | 50879 | 1360 |
| 204m | 0.329 | 0.061 | 0.610 | 1.000 | 1% CuO | 23.16 | -0.97 | 24035 | 1100 |
| 204n | 0.329 | 0.061 | 0.610 | 1.000 | 1% $B_2O_3$ | 21.42 | -27 | 15230 | 1000 |

DIELECTRIC CERAMIC COMPOSITION HAVING WIDE SINTERING TEMPERATURE RANGE AND REDUCED EXAGGERATED GRAIN GROWTH

BACKGROUND OF THE INVENTION

1. Field of the Invention

The present invention is generally in the field of dielectric materials. More specifically, the invention is in the field of dielectric ceramic materials.

2. Background Art

Dielectric ceramic compositions, such as dielectric ceramic compositions that include magnesium ("Mg"), calcium ("Ca"), and titanium ("Ti"), are widely used in dielectric filters, dielectric resonators, and dielectric couplers in various types of radio frequency ("RF") and microwave systems. However, a conventional dielectric ceramic composition that comprises Mg, Ca, and Ti, typically has a narrow sintering temperature range and exaggerated grain growth. Since the narrow sintering temperature range is difficult to maintain in the sintering kiln, the conventional dielectric ceramic may be under-fired (i.e. sintered at a temperature below a desired temperature range) or over-fired (i.e. sintered at a temperature above the desired temperature range) in the sintering kiln. However, under-firing and over-firing can cause various problems in the resulting dielectric composition.

For example, under-firing can cause undesirable variations in the dielectric constant, low density, and reduced mechanical strength in the conventional dielectric ceramic. On the other hand, for example, over-firing can cause undesirable exaggerated grain growth, which can also reduce the mechanical strength of the conventional dielectric ceramic composition. Furthermore, under-firing or over-firing caused by a narrow sintering temperature range results in low manufacturing yield for the conventional dielectric ceramic composition.

Thus, there is a need in the art for a dielectric ceramic composition that has an increased sintering temperature range, reduced exaggerated grain growth, and increased manufacturing yield.

SUMMARY OF THE INVENTION

The present invention is directed to a dielectric ceramic composition having a wide sintering temperature range and a reduced exaggerated grain growth. The present invention addresses and resolves the need in the art for a dielectric ceramic composition that has an increased sintering temperature range, reduced exaggerated grain growth, and increased manufacturing yield.

According to one exemplary embodiment, a dielectric ceramic composition includes a main component group, where the main component group is represented by $Mg_xCa_yZn_zTiO_{2+x+y+z}$, where the sum of x, y, and z is less than or equal to 1.0 such that the dielectric ceramic composition has a wider sintering temperature range and reduced exaggerated grain growth. According to one embodiment, x can be greater than 0.0 and less than 1.0, y can be greater than 0.0 and less than 1.0, and z can be greater than 0.0 and less than 1.0.

The dielectric ceramic composition can further include between 0.0 and 50.0 percent by weight of aluminum oxide. The dielectric ceramic composition can further include copper oxide. The dielectric ceramic composition can further include boron oxide. Other features and advantages of the present invention will become more readily apparent to those of ordinary skill in the art after reviewing the following detailed description and accompanying drawings.

BRIEF DESCRIPTION OF THE DRAWINGS

FIG. 1 shows a table illustrating exemplary compositional range of exemplary dielectric ceramic compositions in accordance with respective embodiments of the present invention.

DETAILED DESCRIPTION OF THE INVENTION

Figure 2:
FIG. 2 shows a table illustrating exemplary electrical properties and exemplary sintering temperatures of exemplary dielectric ceramic compositions in accordance with respective embodiments of the present invention.

The present invention is directed to a dielectric ceramic composition having a wide sintering temperature range and a reduced exaggerated grain growth. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

The present invention provides an innovative dielectric ceramic composition that has a desirably wide sintering temperature range and reduced exaggerated grain growth. The dielectric ceramic composition of the present invention comprises a main component group that can be represented by the formula:

$$Mg_xCa_yZn_zTiO_{2+x+y+z} \quad \text{formula (1)}$$

where "x" can be between 0.0 and 1.0, "y" can be between 0.0 and 1.0, "z" can be between 0.0 and 1.0, and "x+y+z" can be less than or equal to 1.0. In formula (1), "x," "y," and "z" determine the respective relative ratio of Mg (magnesium), Ca (calcium), and Zn (zinc) in the main component group of the invention's dielectric composition. The ratio of "O" (oxygen) in the main component group of the dielectric ceramic composition is determined by the sum "2+x+y+z" in formula (1). In one embodiment, "x" can be between 0.0 and 2.0, "y" can be greater than 0.0 and less than or equal to 1.0, "z" can be between 0.0 and 0.03, and "x+y+z" can be between 1.0 and 2.0 in formula (1). In another embodiment, "x" can be between 0.0 and 2.0, "y" can be greater than 0.0 and less than or equal to 1.0, "z" can be greater than 0.09 and less than or equal to 1.0, and "x+y+z" can be between 1.0 and 2.0 in formula (1).

In the present embodiment, an amount of aluminum oxide ("$Al_2O_3$") can be added to the main component group of the invention's dielectric ceramic composition. By way of example, between 0.0 and 50.0 "percent by weight" of $Al_2O_3$ can be added to the main component group (as represented by formula (1)) of the dielectric ceramic composition of the present invention. In the present application, "percent by weight" is defined as the percentage of the weight of the main component group of the dielectric ceramic composition that is added by the additional component, such as $Al_2O_3$. For example, if the main component group of the invention's dielectric ceramic composition weighs 100.0 kilograms, an addition of 50.0 percent by weight of $Al_2O_3$ would be equal to an amount of $Al_2O_3$ weighing 50.0 kilograms.

The addition of $Al_2O_3$ to the main component group alters the processing parameters, such as the sintering temperature, and other properties of the dielectric ceramic composition. In other embodiments, between 0.0 and 8.0 percent by weight of boron oxide ("$B_2O_3$") and/or between 0.0 and 8.0 percent by weight of copper oxide ("CuO") can be added to the main component group to reduce the sintering temperature (i.e. the final firing temperature) of the dielectric ceramic composition.

FIG. 1 shows an exemplary table including exemplary compositional range of exemplary dielectric ceramic compositions in accordance with respective embodiments of the present invention. Table 100 shows a summation of the compositional range of dielectric ceramic compositions according to various respective embodiments of the present invention as discussed above. Table 100 includes columns 102, 104, 106, 108, 110, and rows 112, 114, and 116. In table 100, column 102 shows the range of "x" in formula (1), column 104 shows the range of "y" in formula (1), column 106 shows the range of "z" in formula (1), column 108 shows the range of "x+y+z" in formula (1), and column 110 shows the percent by weight of $Al_2O_3$ that can be added to the main component group of the invention's dielectric ceramic composition as represented by formula (1). Rows 112, 114, and 116 in table 100 show the range of "x," "y," "z," and "x+y+z" and the percent by weight of $Al_2O_3$ in respective embodiments of the present invention's dielectric ceramic composition.

FIG. 2 shows an exemplary table including exemplary electrical properties and exemplary sintering temperatures of exemplary dielectric ceramic compositions in accordance with respective embodiments of the present invention. Table 200 includes columns 202a through 202i and rows 204a through 204n. In table 200, columns 202a, 202b, 202c, and 202d show respective values of "x," "y," "z," and "x+y+z" in formula (1), column 202e shows the percent by weight of $Al_2O_3$, CuO, or $B_2O_3$, column 202f shows the value of the dielectric constant ("∈"), column 202g shows the value of the temperature coefficient of frequency ("τf") in parts per million per degree centigrade ("PPM/° C."), column 202h shows the value of the quality factor times frequency ("Q×F") in gigahertz ("GHz"), and column 202i shows the value of the sintering temperature in ° C. In table 200, rows 204a through 204n show the dielectric ceramic composition, electrical properties, and sintering temperature of respective embodiments of the present invention.

As shown in rows 204j, 204k, and 204l of table 200, for the same dielectric ceramic composition (i.e. for the same values of "x," "y," "z," and "x+y+z" and the same percent by weight of $Al_2O_3$), present invention's dielectric ceramic composition achieves a wide sintering temperature range of 85.0° C. (i.e. between 1275.0° C. and 1360.0° C.). Additionally, the present invention achieves a dielectric ceramic composition having a dielectric constant of approximately 20.0, a uniform density, and significantly reduced exaggerated grain growth. As a result, the present invention achieves a dielectric ceramic composition having an increased manufacturing yield. In contrast, conventional dielectric ceramic compositions that comprise Mg, Ca, and Ti typically have a narrow sintering temperature range of approximately 5.0° C. to 10.0° C. As a result of the narrow sintering temperature range, the conventional dielectric ceramic compositions can have a varying dielectric constant, significant exaggerated grain growth, and non-uniform density, which cause a reduced manufacturing yield. Additionally, as shown in row 204n of table 200, with the addition of 1.0 percent by weight of $B_2O_3$, an embodiment of the present invention achieves a dielectric ceramic composition having a low sintering temperature of 1000.0° C.

Figure 3:
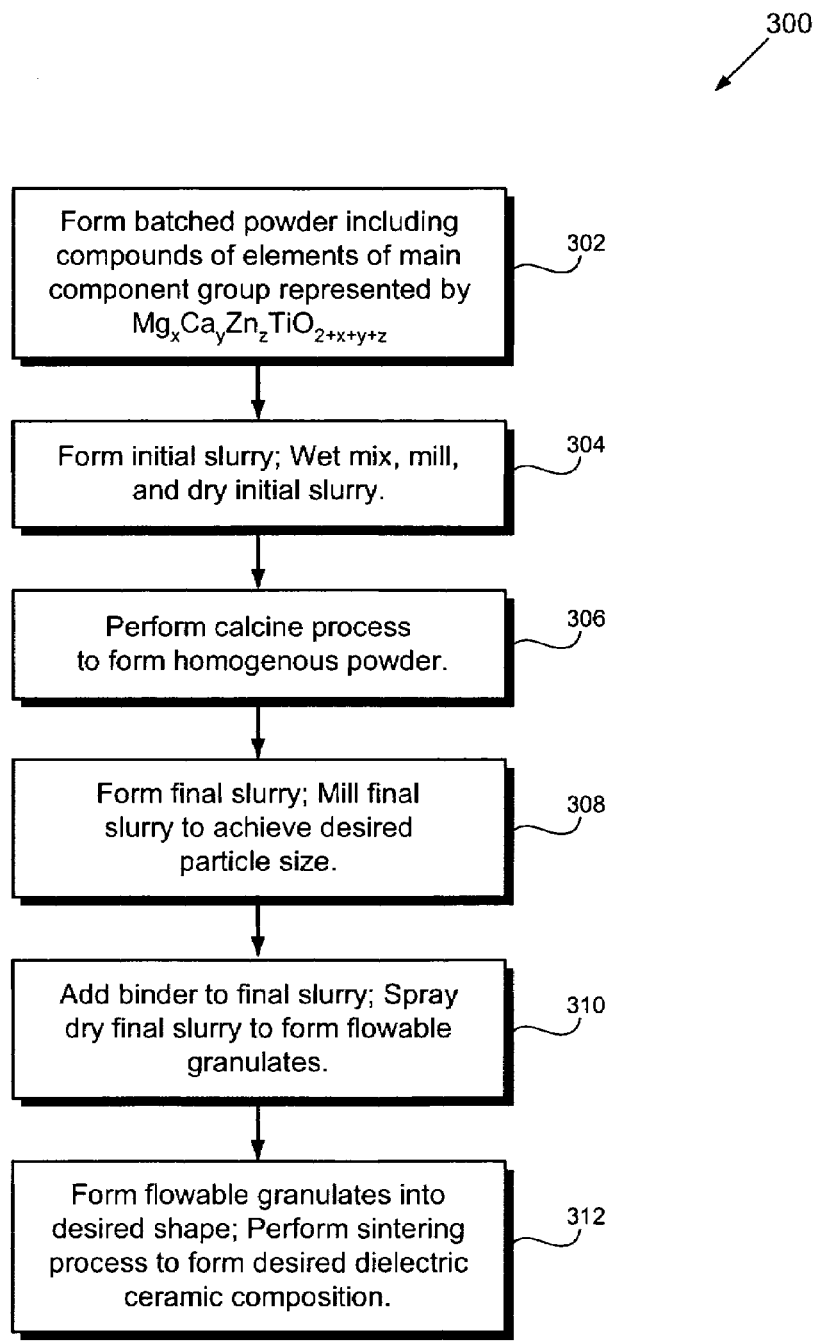
FIG. 3 shows a flowchart illustrating the steps taken to implement a process for forming dielectric ceramic in accordance with one embodiment of the present invention.

FIG. 3 shows a flowchart illustrating an exemplary method for forming a dielectric ceramic composition, in accordance with one embodiment of the present invention. Certain details and features have been left out of flowchart 300 that are apparent to a person of ordinary skill in the art. For example, a step may consist of one or more substeps or may involve specialized equipment or materials, as known in the art.

At step 302 of flowchart 300, a batched powder is formed including compounds of elements of a main component group represented by $Mg_xCa_yZn_zTiO_{2+x+y+z}$ (i.e. formula (1)). The batched powder can comprise MgO, $CaCO_3$, ZnO, and $TiO_2$, which are compounds of respective elements Mg, Ca, Zn, and Ti of the main component group. The batched powder is formed by appropriately weighing out MgO, $CaCO_3$, ZnO, and $TiO_2$ according to ratios determined by selected values of "x," "y," and "z" in formula (1). In other embodiments, different compounds of the elements Mg, Ca, Zn, and Ti of the main component group may be used to form the batched powder.

In the present embodiment, the values "x," "y," and "z" can be greater than 0.0 and less than 1.0 and the value of "x+y+z" can be less than or equal to one. In other embodiments, the value of "x" can be greater than 0.0 and less than 2.0, the value of "y" can be greater than 0.0 and less than or equal to 1.0, the value of "z" can be greater than 0.0 and less than 0.03 or greater than 0.09 and less than or equal to 1.0, and the value of "x+y+z" can be greater than 1.0 and less than 2.0.

After the batched powder has been formed, between 0.0 and 50.0 percent by weight of $Al_2O_3$ can be added to the batched powder. In one embodiment, between 0.0 and 50.0 percent by weight of $Al_2O_3$ can be added to the fabrication process at a subsequent process step. In other embodiments, between 0.0 and 8.0 percent by weight of $B_2O_3$ and/or between 0.0 and 8.0 percent by weight of CuO can be added to the batched powder to reduce the sintering temperature.

At step 304, an initial slurry is formed and the initial slurry is wet mixed, milled, and dried. The initial slurry can be formed by adding an appropriate dispersing agent and deionized water to the batched powder. The initial slurry is then wet mixed, milled, and dried in an oven to form a mechanical mixture. The initial slurry can be milled, for example, in a vibratory mill. However, other milling devices may also be used to mill the initial slurry. At step 306, a calcine process is formed to form a homogenous powder. The homogenous powder can be formed in the calcine process by heating the mechanical mixture in an oven at an appropriate temperature for an appropriate duration so as to cause the individual components in the mechanical mixture to chemically react and, thereby, fuse together. By way of example, the calcine process can be performed at a temperature of approximately 1150.0° C. for approximately 8.0 hours. However, the temperature and duration of the calcine process can vary depending on the particular dielectric ceramic composition that is being formed.

At step 308, a final slurry is formed and milled to achieve a desired particle size. The final slurry can be formed by mixing the homogeneous powder formed at step 306 with deionized water. The final slurry can then be milled to achieve a desired particle size by using a vibratory mill or other appropriate milling device. The milling process can provide a medium particle size, for example, of approximately 2.5 microns having a particle distribution such that approximately 50.0 percent of the particles are smaller than 2.5 microns and approximately 50.0 percent of the particles are larger than 2.5 microns. The medium particle size range can be, for example, between 2.4 microns and 2.7 microns.

At step 310, a binder is added to the final slurry and the final slurry is spray dried to form flowable granulates. The binder can be, for example, polyvinyl alcohol or methyl cellulose, depending on whether a dry-pressing process or an extrusion process, respectively, is utilized to shape the flowable granulates in a subsequent process step. The final slurry can be spray dried to form the flowable granulates in an appropriate spray drying process. At step 312, the flowable granulates are forced into a desired shaped and a sintering process is performed to form a desired dielectric ceramic composition. The flowable granulates can be formed into a desired shaped by utilizing a dry-pressing process or an extrusion process, for example. In the sintering process, the shaped granulates are heated to a sufficiently high temperature to form a dielectric ceramic composition. By way of example, the sintering temperature range can be between 1275.0° C. and 1360.0° C. Thus, the present invention can advantageously achieve a wide sintering temperature range of approximately 85.0° C.

In other embodiments, between 0.0 and 8.0 percent by weight of $B_2O_3$ or CuO can be utilized as an additive to achieve a significantly lower sintering temperature. By way of example, 1.0 percent by weight of $B_2O_3$ can be added at step 302 of the formation process to achieve a sintering temperature of approximately 1000.0° C. By way of example, 1.0 percent by weight of CuO can be added at step 302 of the formation process to achieve a sintering temperature of approximately 1100.0° C. Also, the present invention achieves a dielectric ceramic composition having reduced exaggerated grain growth. In one embodiment, the present invention achieves a dielectric ceramic composition having substantially no exaggerated grain growth. Furthermore, the present invention advantageously achieves a dielectric ceramic composition having substantially uniform electrical properties and substantially uniform density, which increases manufacturing yield. By way of example, the present invention can achieve a dielectric ceramic composition having a dielectric constant of approximately 20.0.

Thus, as discussed above, the present invention advantageously achieves a dielectric ceramic composition having a wide sintering temperature range and inhibited exaggerated grain growth. In contrast, a convention dielectric ceramic composition comprising Mg, Ca, and Ti, typically has a narrow sintering temperature range of approximately 5.0° C. to approximately 10.0° C. with significant undesirable exaggerated grain growth. Thus, the present invention advantageously achieves a dielectric ceramic composition having a wider sintering temperature range and significantly reduced exaggerated grain growth compared to a conventional dielectric ceramic composition comprising Mg, Ca, and Ti.

Additionally, a conventional dielectric ceramic composition comprising Mg, Ca, and Ti typically has non-uniform electric properties and non-uniform density, which decreases manufacturing yield. In contrast, the present invention advantageously achieves a dielectric ceramic composition having substantially uniform electrical properties and density. Consequently, the present invention advantageously provides a dielectric ceramic composition having increased manufacturing yield compared to a conventional dielectric ceramic composition.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, dielectric ceramic compositions having a wide sintering temperature range and a reduced exaggerated grain growth have been described.

The invention claimed is:

1. A dielectric ceramic composition comprising:
   a main component group including magnesium, calcium, zinc, titanium, and oxygen, said main component group being represented by $Mg_xCa_yZn_zTiO_{2+x+y+z}$;
   copper oxide as an additive to said main component group;
   wherein a sum of x, y, and z is less than or equal to 1.0.

2. The dielectric ceramic composition of claim 1 wherein copper oxide is present at up to 8.0 percent by weight.

3. The dielectric ceramic composition of claim 1 further comprising aluminum oxide.

4. The dielectric ceramic composition of claim 3 wherein aluminum oxide is present at up to 50.0 percent by weight.

5. The dielectric ceramic composition of claim 1 further comprising boron oxide.

6. The dielectric ceramic composition of claim 5 wherein boron oxide is present at up to 8.0 percent by weight.

7. A dielectric ceramic composition comprising:
   a main component group including magnesium, calcium, zinc, titanium, and oxygen, said main component group being represented by $Mg_xCa_yZn_zTiO_{2+x+y+z}$;
   aluminum oxide as an additive to said main component group;
   wherein a sum of x, y, and z is less than or equal to 1.0.

8. The dielectric ceramic composition of claim 7 wherein aluminum oxide is present at up to 50.0 percent by weight.

9. The dielectric ceramic composition of claim 7 further comprising copper oxide.

10. The dielectric ceramic composition of claim 9 wherein copper oxide is present at up to 8.0 percent by weight.

11. The dielectric ceramic composition of claim 7 further comprising boron oxide.

12. The dielectric ceramic composition of claim 11 wherein boron oxide is present at up to 8.0 percent by weight.

13. A dielectric ceramic composition comprising:
   a main component group including magnesium, calcium, zinc, titanium, and oxygen, said main component group being represented by $Mg_xCa_yZn_zTiO_{2+x+y+z}$;
   wherein a sum of x, y, and z is less than 1.0.

14. The dielectric ceramic composition of claim 13 further comprising boron oxide.

* * * * *